United States Patent
Shoot

[11] 3,845,364
[45] Oct. 29, 1974

[54] CATHODE ELECTRODE FOR OPERATION UNDER CONDITIONS OF REVERSE POLARITY VOLTAGE

[75] Inventor: Lyle E. Shoot, Indianapolis, Ind.
[73] Assignee: P. R. Mallory & Co., Inc., Indianapolis, Ind.
[22] Filed: Oct. 15, 1973
[21] Appl. No.: 406,312

[52] U.S. Cl. .............................................. 317/230
[51] Int. Cl. ......................... H01g 9/04, H01g 9/08
[58] Field of Search ....................... 317/230; 29/199

[56] References Cited
UNITED STATES PATENTS

| | | | |
|---|---|---|---|
| 2,744,217 | 5/1956 | Aikman | 317/230 |
| 2,871,425 | 1/1959 | Burnham | 317/230 |
| 2,871,426 | 1/1959 | Hilton et al. | 317/230 |
| 3,056,072 | 9/1962 | Schroeder et al. | 317/230 |
| 3,082,360 | 3/1963 | Robinson et al. | 317/230 |
| 3,628,103 | 12/1971 | Booe | 317/230 |

Primary Examiner—Rudolph V. Rolinec
Assistant Examiner—William D. Larkins
Attorney, Agent, or Firm—Hoffman, Charles W.; Robert F. Meyer

[57] ABSTRACT

A cathode electrode surface is composed of an Au-Ag alloy of 40 to 90 wt. percent Au, the remainder Ag. The Ag ions are effectively locked into (bound into) the alloy of the cathode electrode surface by the Au constituent so that when the surface is contacted by a liquid or semi-liquid electrolyte, such as sulfuric acid and the like, and subjected to reverse polarity voltage conditions so that the cathode electrode functions as an anode electrode, harmful amounts of Ag are not dissolved in the electrolyte and deposited on the anode electrode. Under conditions of reverse polarity voltage, the anode electrode tends to function like a cathode electrode and the cathode electrode tends to function like an anode electrode. A Au content of less than about 40 wt. percent in the Au-Ag alloy intended for use as a cathode electrode is insufficient to effectively lock Ag ions in the alloy under conditions of reverse polarity. Consequently, harmful amounts of Ag may be dissolved in the electrolyte from the surface of a Ag containing cathode electrode when subjected to a reverse polarity voltage and deposited on the anode electrode. A Au-Ag alloy wherein the Au content is greater than about 90 wt. percent of the alloy, a loss is experienced in effective cathode capacitance over extended life of the capacitor.

8 Claims, 1 Drawing Figure

PATENTED OCT 29 1974
3,845,364
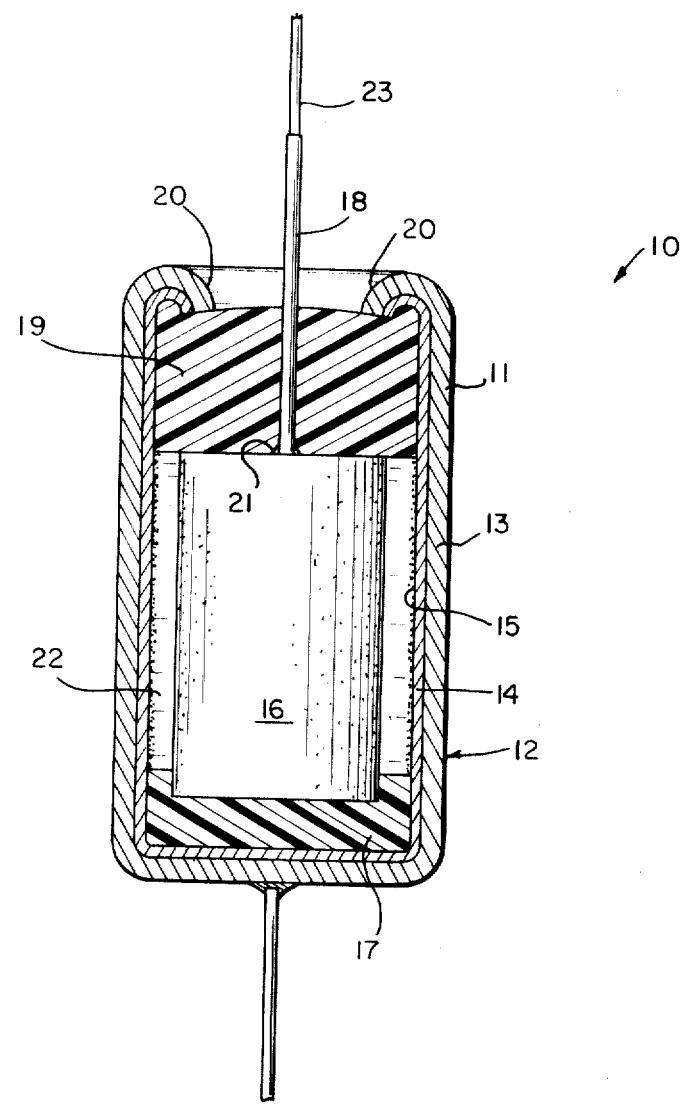

CATHODE ELECTRODE FOR OPERATION UNDER CONDITIONS OF REVERSE POLARITY VOLTAGE

The present invention relates to a Au-Ag alloy of 40 to 90 wt.% Au, the remainder essentially Ag for use as a cathode electrode surface adapted to be contacted by a liquid or semi-liquid electrolyte. The cathode electrode surface of 40 to 90 wt.% Au content of a Au-Ag alloy does not experience dissolution of harmful amounts of Ag in the electrolyte when the cathode electrode surface is subjected to reverse polarity voltage conditions. Within this alloy range, the effective cathode capacitance provides the desired stability when subjected to stress conditions such as voltage, temperature and time.

It is desirable that a cathode electrode surface of an electrical device contacted by a liquid or semi-liquid electrolyte be capable of withstanding reverse polarity voltage operating conditions. A cathode electrode surface operating under reverse polarity voltage conditions tends to function like an anode electrode, and while functioning anodically, one or more of the materials of the cathode electrode surface such as Ag ions may be dissolved in the electrolyte in the event the Ag ions is not effectively locked into (bound into) the metal containing material of the cathode electrode surface.

A typical liquid electrolyte capacitor employs a Ag cathode electrode surface and a film-forming metal anode electrode such as a Ta or Nb anode electrode with a sulfuric acid electrolyte contacting the cathode and anode electrode surfaces. A reverse polarity voltage applied to such a capacitor tends to cause Ag ions of the cathode electrode surface to be dissolved in the electrolyte and electrodeposited over the surface of the anode electrode. A reverse polarity voltage having a magnitude of a few millivolts may cause appreciable reverse polarity current in a capacitor. Re-establishing a voltage of proper polarity may cause a high DC leakage current to flow in the capacitor as a result of the electrolytic dissolution of the Ag ions deposited on the film-forming metal anode electrode during application of a reverse polarity voltage to the capacitor. During electrolytic dissolution of Ag ions from the anode electrode, the capacitor does not operate at its normal operating voltage. This condition continues until the harmful amount of Ag deposited on the anode electrode is dissolved in the electrolyte from the anode electrode, after which the capacitor tends to operate at its normal voltage.

A feature of the present invention is a cathode electrode surface composed of an alloy of about 40 to 90 wt.% Au, the remainder Ag; the cathode electrode surface capable of withstanding voltages of reverse polarity without having harmful amounts of Ag ions dissolved in a liquid or semi-liquid electrolyte and deposited on an anode electrode. Another feature of the present invention is to provide a liquid or semi-liquid electrolyte having a cathode electrode surface of a Au-Ag alloy wherein Ag ions of the alloy are not dissolved in harmful amounts in the electrolyte and deposited on an anode electrode while the cathode electrode is subjected to a voltage of reverse polarity. Another feature of the present invention is a cathode electrode in which the effective cathode capacitance provides good stability under stress conditions, such as voltage, temperature and time. Other features will be apparent from the following description and drawing.

In the drawing:

The FIGURE is a sectional view of an embodiment of a cathode electrode of the present invention employed in a liquid electrolyte capacitor.

It is to be understood that the concepts of the present invention may be employed in an electrical device using a cathode electrode surface other than a capacitor. Generally speaking, such other devices are electrical devices which may experience dissolution of ions from the cathode electrode surface in an electrolyte when the cathode electrode functions anodically.

To achieve the forementioned features, a cathode electrode surface of an alloy of 40 to 90 wt.% Au, the remainder Ag is provided. An electrically conductive finely divided material is provided over the cathode electrode surface to increase the effective area of the surface. The finely divided material may be selected from the group consisting of metals, metal alloys, carbon containing materials and mixtures thereof. The Au-Ag alloy of the cathode electrode surface is not harmfully affected when made anodic in electrolytes such as sulfuric acid, nitric acid, phosphoric acid, and alkali metal salts thereof. Ag ions should not dissolve from the Au-Ag alloy of cathode electrode when the electrode is operated under a reverse polarity voltage condition of up to about one volt and higher for short periods of time. If the Au-Ag alloy has less than 40 wt.% Au, Ag ions are insufficiently locked in the alloy by the Au, and under conditions of reverse voltage polarity, harmful amounts of Ag ions are dissolved in an electrolyte such as sulfuric acid and deposited on the film-forming metal anode electrode, that is, the Ta or Nb anode electrode. If the Au content of the alloy is more than about 90 wt. percent of the alloy, a loss in effective cathode capacitance over extended life of the capacitor may be realized. The present invention, when exposed to high levels of AC ripple, has the capability of withstanding current levels of an order of magnitude higher than the rating for a Ag cathode system.

Alloys of Au-Ag may be formed into a housing for the electrical device by drawing, forging, casting and the like, However, the 40 to 90 wt.% Au, remainder Ag alloy material is expensive. Therefore, it is often uneconomical to employ such an alloy as the entire cathode electrode (that is, the cathode electrode other than simply the cathode electrode surface), although this may be done if required. Where it is uneconomical to employ the Au-Ag alloy as the entire cathode electrode, a substantially pore free, thin film or layer of the Au-Ag alloy of the present invention may be applied to a base means made of less expensive material. For example, a layer of the Au-Ag alloy having thickness of about 0.0015 to about 0.0025 inch may be applied to the interior surface of the base means. The base means typically has a thickness of about 0.010 inch. A typical base means is a metal such as Cu, alloys of Cu, Ag, alloys of Ag (other than alloys of Au-Ag), steel, Ni, Ni alloys, Ta, Nb and the like. With respect to employing a thin film or layer of the Au-Ag alloy of the present invention over the interior surface of a base means, the layer should be substantially free from imperfections such as pores which would allow electrolyte to contact the base means. A base means of Ag or Cu would tend to have Ag ions or Cu ions dissolved in the electrolyte under reverse voltage polarity operating conditions and electrodeposited on the anode electrode if electrolyte contacted the base means thru imperfections in the Au-Ag thin film. Preferably, the layer of the Au-Ag alloy of the present invention is substantially free of imperfections such as pores which would allow electrolyte to contact the base means.

Although almost any metal may be used as the base material, the preferred metals for the container can are Ag, Cu and Cu alloys. Ag, Cu and Cu alloys are preferred primarily because of their resistance under normal capacitor operating conditions to chemical attack by electrolytes typically used in capacitors such as sulfuric acid, nitric acid and phosphoric acid should there be imperfections in the layer of the Au-Ag alloy allowing electrolyte to contact the base material. Under non-oxidizing conditions elemental metals of Ag, Cu and alloys thereof are not chemically attacked. The most preferred base materials are Cu, Ag, alloys of Cu, brass, bronze and NiCu alloys such as MONEL. Also base materials of low carbon steel, alloy steel or stainless steel or other strong metals may be used where the application requires severe strength and/or rigidity. A film-forming metal such as Ta or Nb may be used as the base material.

There are various methods to apply the Au-Ag alloy layer of the present invention to the inner surface of the base material and the invention is in no way to be limited to the particular method chosen. One method is to provide a sheet of base material to which is applied a layer of the Au-Ag alloy by high temperature roll bonding or brazing. The sheet is then formed into a housing by a deep drawing process with the Au-Ag alloy forming the inner surface of the housing. Another possible method which may be used for the more ductile metals and alloys involves masking one side of an Ag or Cu sheet and then electroplating the layer of the Au-Ag alloy of the present invention on the un-masked side of the sheet. The plate sheet is treated to close any pores, then stamped and drawn into a housing that functions as the cathode electrode. Another possible method is to form a base material of Ag or Cu into a suitable housing configuration, apply over the interior surface thereof a thin layer of the Au-Ag alloy and roll bond the Au-Ag alloy to the inner surface of the housing to provide an integral structure wherein the layer of the Au-Ag alloy is substantially free of pores and is substantially uniform in thickness.

In another possible method discrete layers of Au may be applied over the interior surface of the housing of base metal and treated to diffuse the layers into one another and to join the resultant Au-Ag alloy ions to the interior surface of the base metal. A suitable treatment is to heat the layers of Au and Ag for a time and at a temperature adequate to diffuse the Ag and Au layers into one another and to form a diffusion bond with the interior surface of the base material.

In another embodiment, the housing may have a layer intermediate to the base material and the Au-Ag alloy. The intermediate layer may be selected from a film-forming metal such as Ta or Nb. This presents the opportunity to bond a Ta or Nb layer to an inexpensive base material such as Cu or Cu alloys and at the same time bond the Au-Ag alloy layer of the present invention to the Ta or Nb layer. The thickness of the Au-Ag alloy in its final thickness is in the order of about 0.00005 to about 0.0003 inch. The thickness of the Ta or Nb in its final thickness is about 0.001 to about 0.003 inch. The Ta or Nb act as a barrier to the electrolyte contacting the base metal.

A smooth surface of the Au-Ag alloy cathode electrode of the present invention when used with a sintered slug or other type of high capacitance anode electrode does not have sufficient surface area for good capacitor operation. If it is desired that the anode electrode exhibit near its full capacitance, the cathode electrode must have many times the capacitance area of that of the anode electrode. In order to provide the cathode electrode surface with the surface area required, it is necessary to increase the effective surface area of the cathode electrode surface by applying to the cathode electrode surface a finely divided material and having very high chemical and electro-chemical resistance to the electrolyte. Examples, such materials include finely divided Pt, Au, Au/Pt alloys, carbon and mixtures of the foregoing. It has been found that the presences of Ag in the alloy provides a low resistance coupling between the Au-Ag alloy and the finely divided Pt which withstands ageing at high temperatures and voltage stress.

Finely divided Pt may be applied to the surface of the cathode electrode by electrodeposition of Pt from solution containing $H_2PtCl_6$ or applied by brushing platinum black over the surface. Carbon or graphite may be applied as a paint having a suitable binder, for example, as described in U.S. Pat. No. 3,243,316, to hold the particles in place and to maintain electrical contact with the inert metal surface. Other methods of application may be used within the scope of the present invention, the foregoing given by way of example only.

The electrolyte used in a capacitor employing the cathode electrode surface of the present invention must be one in which ions of the elemental metals are not dissolved to a harmful degree, anodically from the cathode electrode, which withstands a reverse polarity voltage conditions without decomposing, and which has sufficient conductivity to operate effectively in normal operation. A 39 percent concentration of sulfuric acid is the preferred electrolyte for a capacitor; however, other electrolytes such as nitric acid and phosphoric acid may be used as electrolytes in capacitor. For certain applications, it would be permissible to employ the soluble salts of these acids as electrolytes; for example the soluble alkali and alkaline earth metal salts.

A capacitor using the cathode electrode of the present invention may be operated at a temperature as low as $-55°C$ and as high as about $+125°C$ depending upon the electrolyte employed.

An electrical device such as capacitor 10 using an embodiment of the cathode electrode 11 of the invention is shown in the FIGURE of the drawing. The capacitor 10 includes a housing 12 which is the cathode electrode. The housing 12 includes a base material 13 and the Au-Ag alloy 14 of the present invention over the interior surface to provide a cathode electrode surface. The interior surface of housing 12 has applied to it a layer 14 of 40–90 wt.% Au, the remainder Ag. Additionally, a layer 15 of finely divided material such as Pt is applied to the alloy layer 14 to increase the effective surface area of the cathode electrode. A porous anode electrode 16 of the capacitor 10 is made from a suitable film-forming metal such as Ta or Nb. The surfaces of the anode electrode 16 are covered by a dielectric oxide film (not shown) of the film-forming metal.

A spacer 17 helps to retain the anode electrode 16 in spaced relation relative to the cathode surface 15. A Ta lead 18 passes through an apertured seal 19 which, for example, may be made of a suitable elastomeric material or may be a glass-to-metal seal (not shown) or a glass-to-ceramic seal (not shown). The particular seal construction may vary as desired to meet the requirements of particular applications. The seal 19 is held in place by suitably crimping the cathode housing 12 as indicated at 20. The Ta lead 18 is welded as at 21 to the anode electrode 16. An electrolyte 22, such as, a 39% concentration of sulfuric acid fills the void space between and contacts the cathode surface 15 and the dielectric film (not shown) over the anode electrode 16. The anode lead 18 is conductively attached to wire 23 such as by welding or soldering.

Various shapes of anode electrodes may be used. Also, while Ta has been disclosed as the anode electrode 16, other film-forming metals, particularly Nb, could be used.

Furthermore, the invention is in no way to be limited to the particular shape of the cathode housing 12; a wide variety of shapes and geometries may be used for the cathode housing 12 and still fall within the scope of the present invention.

The following example is given by way of illustration of several concepts involved in the invention.

EXAMPLE

An alloy of about 50 wt.% Au, the remainder Ag is formed on a base metal of Ag to provide a cathode electrode surface as shown in the FIGURE of the drawing. The alloy is substantially pore free. Finely divided Pt is provided over the Au-Ag alloy to increase the capacitance area of the cathode surface. A sulphuric acid electrolyte and Ta anode are used. The capacitance of the capacitor is about 464 microfarads with an applied operating voltage of about 6 volts direct current at about 25°C. The DC leakage current is about 0.21 microamperes and the dissipation factor is about 16 percent. After about 2,000 hours of operation with an applied working voltage of about 6 volts direct current at about 85°C, the DC leakage current is about 0.10 microamperes, the dissipation factor is about 29 percent and the capacity is about 460 microfarads.

An alloy of about 50 wt.% Au, the remainder Ag is formed on a base metal of Ag to provide a cathode electrode surface as shown in FIGURE of the drawing. The alloy is substantially pore free. Finely divided Pt is provided over the Au-Ag alloy to increase the capacitance area of the cathode electrode surface. A sulphuric acid electrolyte and Ta anode are used. The capacitance of the capacitor is about 459 microfarads with an applied operating voltage of about 6 volts direct current at 25°C. The DC leakage current is about 0.05 microamperes and the dissipation factor is about 12%. After about 125 hours of operation with an applied reverse polarity voltage of about 1 volt direct current at 85°C, the forward DC leakage current is about 0.44 microamperes, the dissipation factor is about 15 percent and the capacitance is about 405 microfarads. This capacitor is then placed on forward voltage for about 125 hours at about 6 volts and about 85°C. The DC leakage is about 0.015 microamperes, the dissipation factor is about 13% and capacitance is about 462 microfarads.

An Ag cathode electrode surface is provided. The Ag surface is substantially pore free. Finely divided Pt is provided over the Ag surface to increase the capacitance area of the cathode electrode surface. A sulfuric acid electrolyte and Ta anodes are used. The capacitance of the Ag cathode capacitor is about 450 microfarads with an applied operating voltage of about 6 volts direct current at 250°C. The DC leakage current is about 0.39 microamperes and the dissipation factor is about 14.5 percent. After about 15 minutes of operation with an applied reverse polarity voltage of about 0.9 volts direct current at about 25°C, the DC leakage current is about 300 microamperes. It is apparent that the Au-Ag alloy cathode electrode surface has significant advantages when the surface is subjected to anodic conditions as compared to an Ag cathode electrode.

The presence of small amounts of impurity elements in the Au-Ag alloy cathode electrode of the present invention is not believed to play a critical role in the invention.

The cathode electrode of the present invention has been described in its presently preferred embodiment. However, it is to be understood that wt.% of Au to Ag, the shape of the cathode electrode and the use thereof in electrical devices can vary widely without departing from the concepts of the invention.

I claim:

1. In combination, an anode electrode and a cathode electrode including a surface adapted to be contacted by a liquid or semi-liquid electrolyte, the cathode electrode surface comprising an alloy of about 40 to about 90 wt.% Au, the remainder essentially Ag, and electrically conductive finely divided material over the cathode electrode surface to increase the effective area of the surface, the finely divided material selected from the group consisting of metals, metal alloys, carbon containing materials and mixtures thereof.

2. The combination of claim 1, wherein base material is joined to a surface of the Au-Ag alloy opposite the surface of the Au-Ag alloy with the finely divided material.

3. The combination of claim 2 wherein a surface of the cathode electrode is substantially pore-free.

4. The combination of claim 3 wherein the base material is selected from the group including Ag, Ag alloys other than Ag-Au alloys, Cu, Cu alloys, steel, Ni, Ni alloys, Nb, and Ta.

5. An electrical device comprising the combination of claim 1 and an electrolyte contacting the combination.

6. The electrical device of claim 5 wherein the electrolyte is selected from the group including sulfuric, nitric, and phosphoric acids, and alkali metal salts thereof, and wherein the anode electrode is composed of a film-forming metal selected from the group consisting of Ta and Nb.

7. A capacitor including the anode electrode and cathode electrode of claim 1, wherein said anode electrode comprises a film-forming metal, said capacitor further comprising a dielectric oxide film of the film-forming metal over the anode, and an electrolyte contacting the dielectric oxide film and the cathode electrode surface.

8. The capacitor of claim 7, wherein the electrolyte is selected from the group including sulfuric, nitric, and phosphoric acids, and alkali metal salts thereof, and wherein the film-forming metal anode electrode is selected from the group consisting of Ta and Nb.

* * * * *

UNITED STATES PATENT OFFICE
CERTIFICATE OF CORRECTION

PATENT NO. : 3,845,364
DATED : 10/29/74
INVENTOR(S) : Lyle E. Shoot

It is certified that error appears in the above-identified patent and that said Letters Patent are hereby corrected as shown below:

Col. 2, line 44 Delete "," after like and substitute therefore ---.---

Col. 6, line 8, delete "250°C" and substitute therefore ---25°C---

Signed and sealed this 20th day of May 1975.

(SEAL)
Attest:

RUTH C. MASON
Attesting Officer

C. MARSHALL DANN
Commissioner of Patents
and Trademarks